(12) United States Patent
Pirich et al.

(10) Patent No.: US 7,798,903 B2
(45) Date of Patent: Sep. 21, 2010

(54) SYSTEM AND METHOD FOR ACCESSING SYSTEM SOFTWARE IN A GAMING CONSOLE SYSTEM VIA AN INPUT DEVICE

(75) Inventors: Christopher Pirich, Seattle, WA (US); James David Macauley, Bellevue, WA (US); Jeffrey Edward Simon, Sammamish, WA (US); Jon Marcus Randall Whitten, Sammamish, WA (US); Yasser B. Asmi, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1407 days.

(21) Appl. No.: 10/836,410

(22) Filed: Apr. 30, 2004

(65) Prior Publication Data

US 2005/0245314 A1  Nov. 3, 2005

(51) Int. Cl.
*A63F 13/00* (2006.01)
*G06F 12/02* (2006.01)

(52) U.S. Cl. .................................. 463/36; 711/159

(58) Field of Classification Search ............ 463/40–42, 463/36; 711/159; 725/9, 42, 45, 97; 718/100; 348/569; 709/205, 204, 228; 707/202; 715/764
See application file for complete search history.

(56) References Cited

U.S. PATENT DOCUMENTS

| | | | |
|---|---|---|---|
| 5,652,630 A * | 7/1997 | Bertram et al. ............. | 348/734 |
| 5,745,109 A * | 4/1998 | Nakano et al. ............. | 715/838 |
| 5,812,124 A * | 9/1998 | Eick et al. ................ | 725/45 |
| 6,078,942 A * | 6/2000 | Eisler et al. .............. | 718/100 |
| 6,111,614 A * | 8/2000 | Mugura et al. ............ | 348/569 |
| 6,128,713 A | 10/2000 | Eisler et al. .............. | 711/159 |
| 6,345,293 B1 | 2/2002 | Chaddha ................... | 709/219 |
| 6,401,211 B1 | 6/2002 | Brezak, Jr. et al. ......... | 713/201 |
| 6,526,416 B1 | 2/2003 | Long ....................... | 707/202 |
| 6,718,360 B1 | 4/2004 | Jones et al. ............... | 709/107 |
| 7,155,674 B2 * | 12/2006 | Breen et al. .............. | 715/719 |
| 2003/0035007 A1 * | 2/2003 | Wugofski ................ | 345/764 |

(Continued)

FOREIGN PATENT DOCUMENTS

JP   2001-109714   4/2001

(Continued)

OTHER PUBLICATIONS

Jones, M.B. et al., "CPU Reservations and time Constraints: Efficient, Predictable Scheduling of Independent Activities", http://research.microsoft.com/~mbj/papers/sosp97/sosp97.html, Feb. 24, 2004, 24 pages.

(Continued)

*Primary Examiner*—Peter DungBa Vo
*Assistant Examiner*—Masud Ahmed
(74) *Attorney, Agent, or Firm*—Woodcock Washburn LLP

(57) ABSTRACT

A user interface on a controller for a gaming console that provides access to system software from within any gaming application running on the console. The system software runs concurrently with other gaming applications and renders a system user interface, system notifications, and messages on top of running gaming applications. The user interface can be added to any controller and other peripheral to access to the system menu such that users can have a uniform experience without requiring substantial effort by gaming application developers.

16 Claims, 6 Drawing Sheets

U.S. PATENT DOCUMENTS

2003/0090660 A1* 5/2003 Welchman et al. .......... 356/394
2003/0106769 A1* 6/2003 Weiss ......................... 194/201

FOREIGN PATENT DOCUMENTS

JP          2002-73249          3/2002

OTHER PUBLICATIONS

Kalavade, A. et al., "AsaP-A Framework for Evaluating Run-time Schedulers in Embedded Multimedia End-Systems", *ACM*, 1998, 291-296.

Nieh, J. et al., "A SMART Scheduler for Multimedia Applications", *ACM Transactions on Computer Systems*, May 2003, 21(2), 117-163.

Poellabauer, C. et al., "Coordinated CPU and Event Scheduling for Distributed Multimedia Applications", *MM*, 2001, 231-240.

Waldspurger, C.A., "Memory Resource Management in VMware ESX Server", *5th Symposium on Operating Systems Design and Implementation(OSDI)*, Dec. 9-11, 2002, 181-194.

Nagashima et al., "The PlayStation2 Books, Nebula-Echonight- Official Complete Guide", First Edition, Softbank Publishing, Corp., Feb. 4, 2004, 12-13.

Takebe et al., "The Special Winning System at PlayStation, Metal Slug Official Guidebook", First Edition, Keibunsha, Sep. 25, 1997, 3.

V Jump Books [Game Series], "PlayStation Combat ChoroQ, Perfect Official Operational Book", First Printing, Shueisha Inc., Mar. 9, 1999, 6.

\* cited by examiner

SYSTEM AND METHOD FOR ACCESSING SYSTEM SOFTWARE IN A GAMING CONSOLE SYSTEM VIA AN INPUT DEVICE

COPYRIGHT NOTICE/PERMISSION

A portion of the disclosure of this patent document contains material, which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings hereto: Copyright® 2004, Microsoft Corporation, All Rights Reserved.

FIELD OF THE INVENTION

This invention generally relates to the field of gaming devices. In particular, the present invention is directed to a system architecture that enables an input device to access a host application running on the gaming device to provide system functionalities.

BACKGROUND OF THE INVENTION

A user wishing to view or interact with the system software in conventional gaming consoles must first remove all media from the media drive and power-up the console. This action brings the user to the system menu where certain settings such as time, video and audio output mode may be configured. The user may also listen to music or rip a soundtrack from a CD, manage a memory unit or content stored on the hard drive, and perform do a variety of things relating to networked features. A drawback of conventional systems is that any system application that user may need to access while interacting with a gaming application running on the console must be duplicated in the gaming application. This creates a great deal of additional work for developers and creates an inconsistent user experience as system application functionality may be implemented differently for each gaming application.

In addition to the above, even if the system applications are provided within the gaming applications, there is no way for users to quickly and easily access the system applications while interacting with gaming application. Thus, there is a need for a system and method for providing a system menu that runs concurrently with other gaming applications and will be quickly accessible via, e.g., the press of a button. By pressing the button a user will access the system menu which will provide the user access to all system and service functionalities. The present invention provides such a solution.

SUMMARY OF THE INVENTION

The invention enables a user of a gaming console to quickly access the system software from within any gaming application running on the console. The system software runs concurrently with other gaming applications and can assume control of the graphics processor in order to display a system user interface (UI), system notifications, and messages on top of running applications and movies. The invention provides a uniform UI that can be added to a controller and other peripheral for quick access to the system menu such that users can have a uniform experience without requiring substantial effort by gaming application developers.

In accordance with an aspect of the present invention, there is provided a gaming system that includes a central processing unit, a graphics processing unit, a memory, and an input device. The input device includes a system interface mechanism that accesses system functionalities provided by a system application concurrently running on the gaming system with a gaming application. When the system application receives a request for system functionalities from the system interface mechanism, a system menu is provided to access the system functionalities via the input device.

In accordance with a feature of the invention, the input device may include a visual indicator that indicates the system is awaiting user input.

In accordance with another aspect of the invention, there is provided a gaming console input device that includes a plurality of control buttons, a system request interface button, and a visual indicator. The system request interface button produces a request for system functionalities that is received by a system application concurrently running on a gaming console with a gaming application. A system menu is then provided to access the system functionalities provided by the system application via the gaming console input device.

According to another aspect of the invention, there is provided a method in a gaming console of providing system functionalities provided by system applications concurrently executing with a gaming application. The method includes receiving a request for the system functionalities from a controller, rendering a system menu as an overlay on top of the gaming application executing on the gaming console, and providing access to the system functionalities via the system menu.

Additional features and advantages of the invention will be made apparent from the following detailed description of illustrative embodiments that proceeds with reference to the accompanying drawings.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF ILLUSTRATIVE EMBODIMENTS

Figure 1:
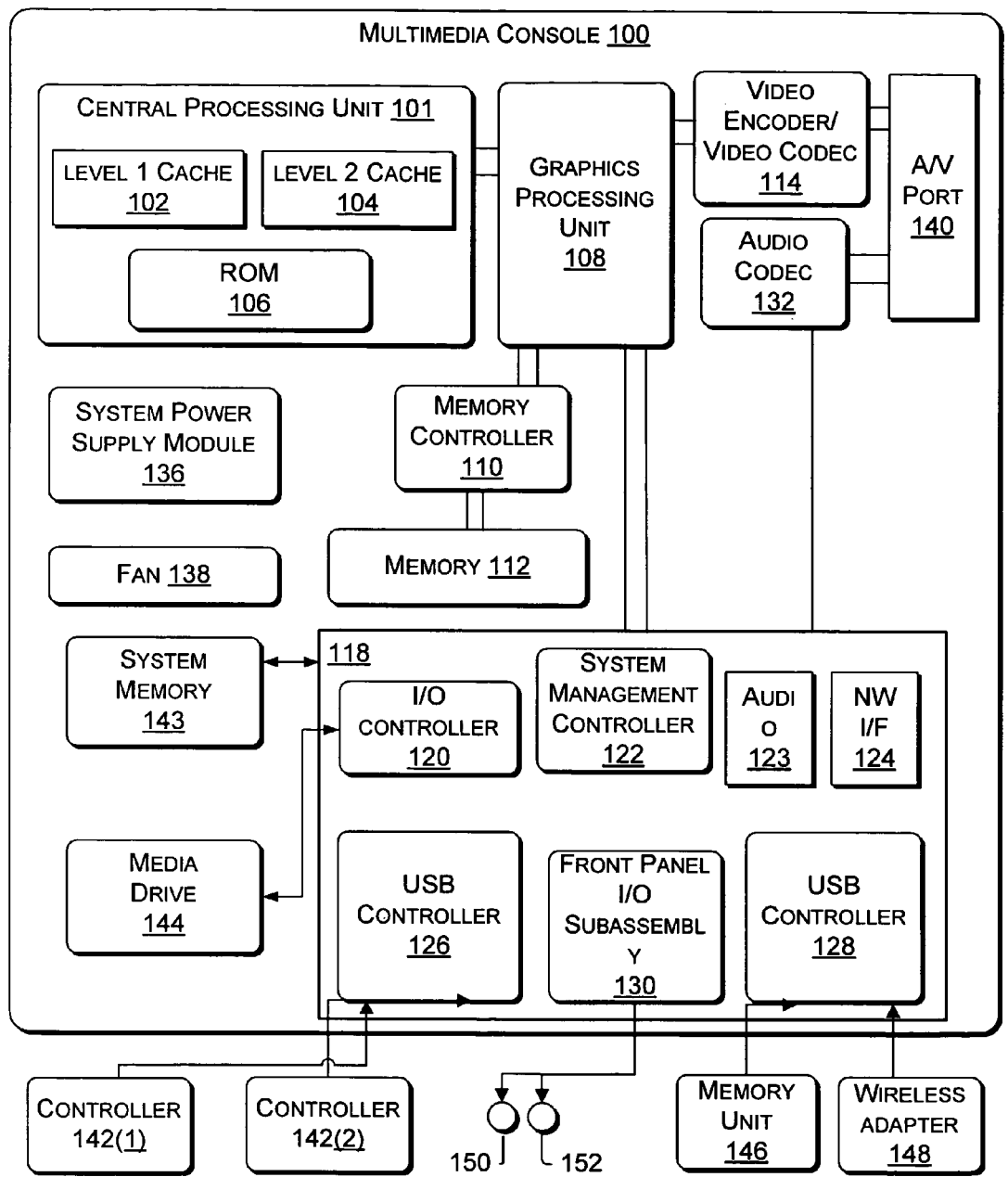
FIG. 1 is a block diagram showing a gaming console in which aspects of the present invention may be implemented.

FIG. 1 illustrates the functional components of a gaming console 100 in which certain aspects of the present invention may be implemented. The gaming console 100 has a central processing unit (CPU) 101 having a level 1 cache 102, a level 2 cache 104, and a flash ROM (Read Only Memory) 106. The level 1 cache 102 and a level 2 cache 104 temporarily store data and hence reduce the number of memory access cycles, thereby improving processing speed and throughput. The CPU 101 may be provided having more than one core, and thus, additional level 1 and level 2 caches 102 and 104. The flash ROM 106 may store executable code that is loaded during an initial phase of a boot process when the gaming console 100 is powered ON.

A graphics processing unit (GPU) 108 and a video encoder/video codec (coder/decoder) 114 form a video processing pipeline for high speed and high resolution graphics processing. Data is carried from the graphics processing unit 108 to the video encoder/video codec 114 via a bus. The video processing pipeline outputs data to an A/V (audio/video) port 140 for transmission to a television or other display. A memory controller 110 is connected to the GPU 108 to facilitates processor access to various types of memory 112, such as, but not limited to, a RAM (Random Access Memory).

The gaming console 100 includes an I/O controller 120, a system management controller 122, an audio processing unit 123, a network interface controller 124, a first USB host controller 126, a second USB controller 128 and a front panel I/O subassembly 130 that are preferably implemented on a module 118. The USB controllers 126 and 128 serve as hosts for peripheral controllers 142(1)-142(2), a wireless adapter 148, and an external memory device 146 (e.g., flash memory, external CD/DVD ROM drive, removable media, etc.). The network interface 124 and/or wireless adapter 148 provide access to a network (e.g., the Internet, home network, etc.) and may be any of a wide variety of various wired or wireless interface components including an Ethernet card, a modem, a Bluetooth module, a cable modem, and the like.

System memory 143 is provided to store application data that is loaded during the boot process. A media drive 144 is provided and may comprise a DVD/CD drive, hard drive, or other removable media drive, etc. The media drive 144 may be internal or external to the gaming console 100. Application data may be accessed via the media drive 144 for execution, playback, etc. by the gaming console 100. The media drive 144 is connected to the I/O controller 120 via a bus, such as a Serial ATA bus or other high speed connection (e.g., IEEE 1394).

The system management controller 122 provides a variety of service functions related to assuring availability of the gaming console 100. The audio processing unit 123 and an audio codec 136 form a corresponding audio processing pipeline with high fidelity and stereo processing. Audio data is carried between the audio processing unit 123 and the audio codec 126 via a communication link. The audio processing pipeline outputs data to the A/V port 140 for reproduction by an external audio player or device having audio capabilities.

The front panel I/O subassembly 130 supports the functionality of the power button 150 and the eject button 152, as well as any LEDs (light emitting diodes) or other indicators exposed on the outer surface of the gaming console 100. A system power supply module 136 provides power to the components of the gaming console 100. A fan 138 cools the circuitry within the gaming console 100.

The CPU 101, GPU 108, memory controller 110, and various other components within the gaming console 100 are interconnected via one or more buses, including serial and parallel buses, a memory bus, a peripheral bus, and a processor or local bus using any of a variety of bus architectures.

When the gaming console 100 is powered ON, application data may be loaded from the system memory 143 into memory 112 and/or caches 102, 104 and executed on the CPU 101. The application may present a graphical user interface that provides a consistent user experience when navigating to different media types available on the gaming console 100. In operation, applications and/or other media contained within the media drive 144 may be launched or played from the media drive 144 to provide additional functionalities to the gaming console 100.

The gaming console 100 may be operated as a standalone system by simply connecting the system to a television or other display. In this standalone mode, the gaming console 100 allows one or more users to interact with the system, watch movies, or listen to music. However, with the integration of broadband connectivity made available through the network interface 124 or the wireless adapter 148, the gaming console 100 may further be operated as a participant in a larger network community.

When the gaming console 100 is powered ON, a set amount of hardware resources are reserved for system use by the gaming console operating system. These resources may include a reservation of memory (e.g., 16 MB), CPU and GPU cycles (e.g., 5%), networking bandwidth (e.g., 8 kbs), etc. Because these resources are reserved at system boot time, the reserved resources do not exist from the application's view.

In particular, the memory reservation preferably is large enough to contain the launch kernel, concurrent system applications and drivers. The CPU reservation is preferably constant such that if the reserved CPU usage is not used by the system applications, an idle thread will consume any unused cycles.

With regard to the GPU reservation, lightweight messages generated by the system applications (e.g., popups) are displayed by using a GPU interrupt to schedule code to render popup into an overlay. The amount of memory required for an overlay depends on the overlay area size and the overlay preferably scales with screen resolution. Where a full user interface is used by the concurrent system application, it is preferable to use a resolution independent of game resolution. A scaler may be used to set this resolution such that the need to change frequency and cause a TV resynch is eliminated.

After the gaming console 100 boots and system resources are reserved, concurrent system applications execute to provide system functionalities. The system functionalities are encapsulated in a set of system applications that execute within the reserved system resources described above. The operating system kernel identifies threads that are system application threads versus gaming application threads. The system applications are preferably scheduled to run on the CPU 101 at predetermined times and intervals in order to provide a consistent system resource view to the application. The scheduling is to minimize cache disruption for the gaming application running on the console.

When a concurrent system application requires audio, audio processing is scheduled asynchronously to the gaming application due to time sensitivity. A gaming console application manager (described below) controls the gaming application audio level (e.g., mute, attenuate) when system applications are active.

Input devices (e.g., controllers 142(1) and 142(2)) are shared by gaming applications and system applications. The input devices are not reserved resources, but are to be switched between system applications and the gaming application such that each will have a focus of the device. The application manager preferably controls the switching of input stream, without knowledge the gaming application's knowledge and a driver maintains state information regarding focus switches.

Figure 2:
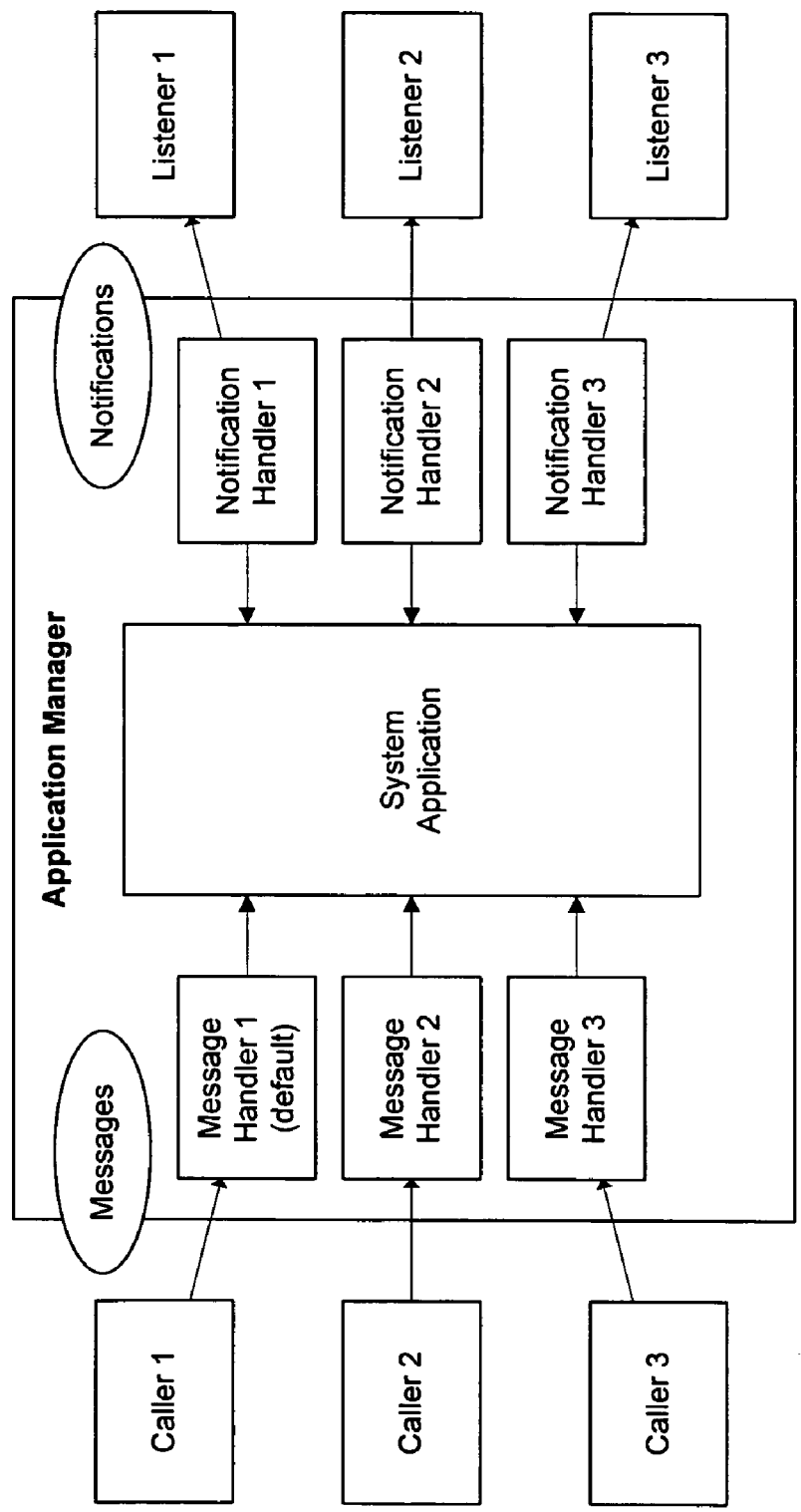
FIG. 2 is an block diagram illustrating an application manager.

Referring to FIG. 2, there is illustrated the application manager and its relationship to the system applications and gaming applications. The communication to system applications is preferably message based. APIs are exposed to the gaming applications that wrap messages. Communication from the system applications is notification based. Multiple listeners and multiple callers are supported using small proxy objects.

As noted above, concurrent system applications provide system functionalities as the gaming application executes, and require little, if any, support from the gaming application. As will now be described in further detail, an exemplary system functionality provided by a concurrent application is a system menu that is called through a system interface request button (device) provided on a controller. The ability to call the system menu while interacting with a gaming application greatly enhances the user's experience as system functionalities are provided in a consistent manner across all gaming applications running on the gaming console 100.

Figure 3:
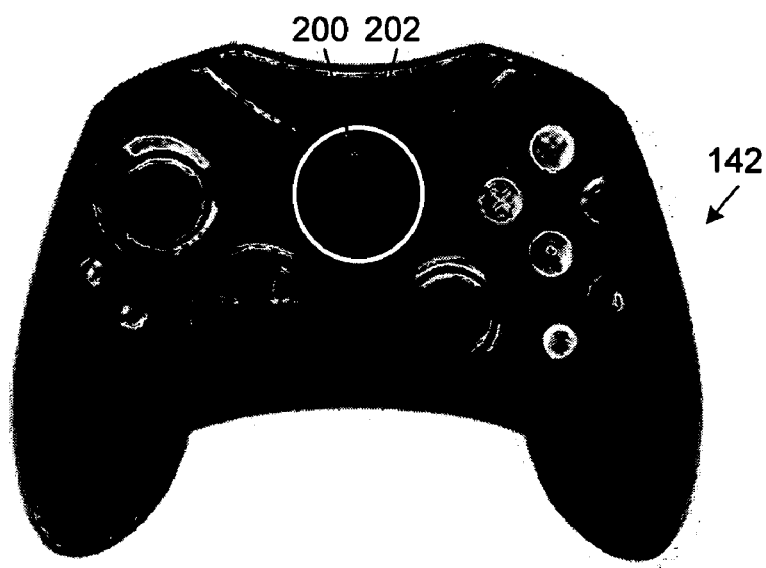
FIGS. 3-5 are exemplary controllers in accordance with the present invention.
Figure 4:
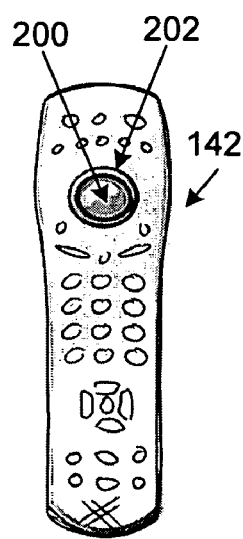
Figure 5:
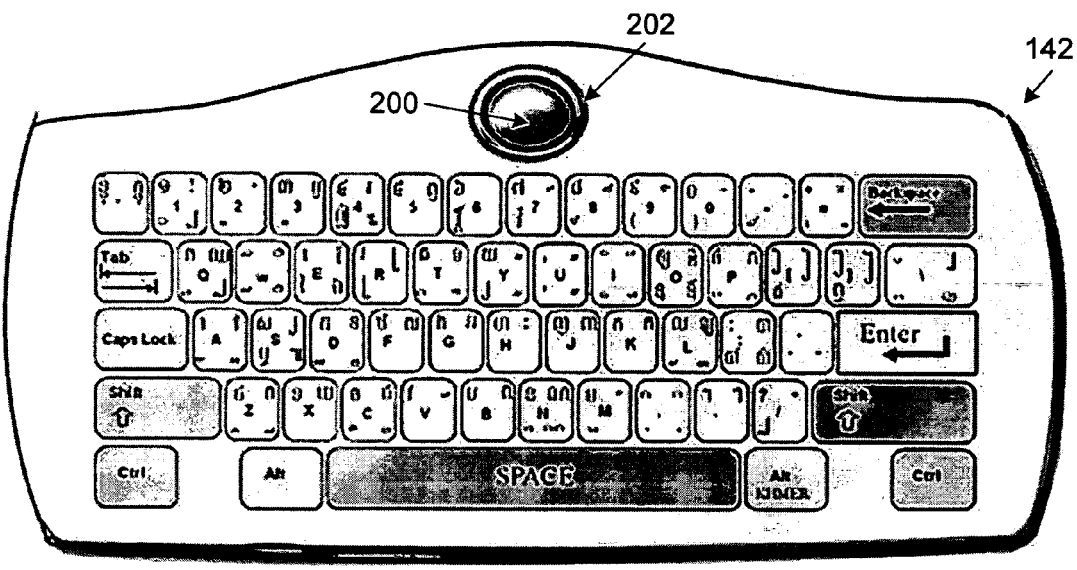

Referring to FIGS. 3-5, there are illustrated various exemplary controllers 142 that include a system interface request button 200 of the present invention in addition to movement and accessory controls, a keyboard, etc. The interface button 200 provides for quick and easy access to necessary system functionalities provided by the concurrent system applications and the system menu. This function eliminates the need for the gaming applications to provide similar support, thus reducing the burden on developers. In addition, a visual indicator 202 is provided to indicate that the system would like the user's attention in order to display, e.g., an incoming message, status information, etc. The visual indicator 202 may comprise a lighted ring around the interface button 200 that illuminates, flashes, changes color, etc. when the user's attention is requested.

It is noted that the interface to the system menu is shown as interface button 200. However, one of ordinary skill in the art will recognize that other interfaces may be used to request the system menu, such as a command sequence entered via the controller 142, a voice recognition system, etc. Further, one of ordinary skill in the art will also recognize that other means may be used to request the user's attention in addition to, or alternatively to, the visual indicator 202. For example, an audible alarm, a graphical display, etc. may be used to gain the user's attention.

Figure 6:
FIG. 6-9 are exemplary user interfaces illustrating the presentation of system information during the execution of a gaming application on the gaming console.
Figure 7:
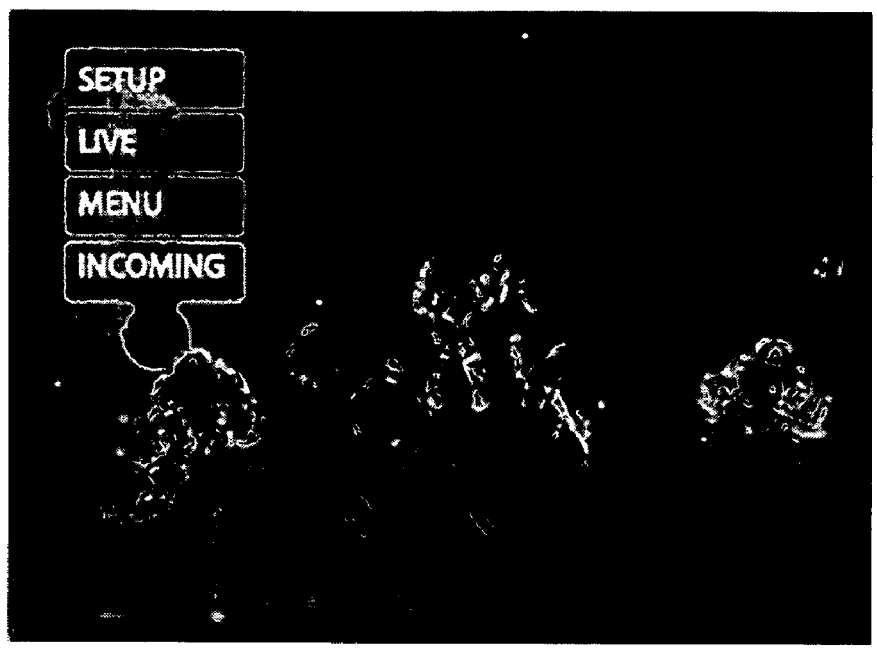

Referring to FIGS. 6-9, there is illustrated an exemplary system menu functionality provided by the concurrent system applications and the interface button 200. FIGS. 6-9 are provided for non-limiting, illustrative purposes only, as one of ordinary skill in the art would recognize that other system functionalities and interfaces may be provided based on the teachings herein. FIG. 6, illustrates the graphical rendering of a gaming application, as displayed on, e.g. a television or monitor. When the user presses the interface button 200, a concurrent system application recognizes the button press and, via the GPU 108, renders the system menu as an overlay (FIG. 7). The execution of the gaming application may pause to allow the user to interact with the system menu. The user may be prompted to press the interface button via the visual indicator 202, The user may select from the system functionalities listed (SETUP, LIVE, MENU and INCOMING). The system menu is comprised of several applications which contain the various system and service related features. It is preferable that each application runs as a concurrent application to limit system resources taken away from gaming applications in order to run the system menu at any given time and to allow for the easier updating of individual system applications. It is noted that additional or fewer menu items may populate the system menu than those shown in FIG. 7.

Figure 8:
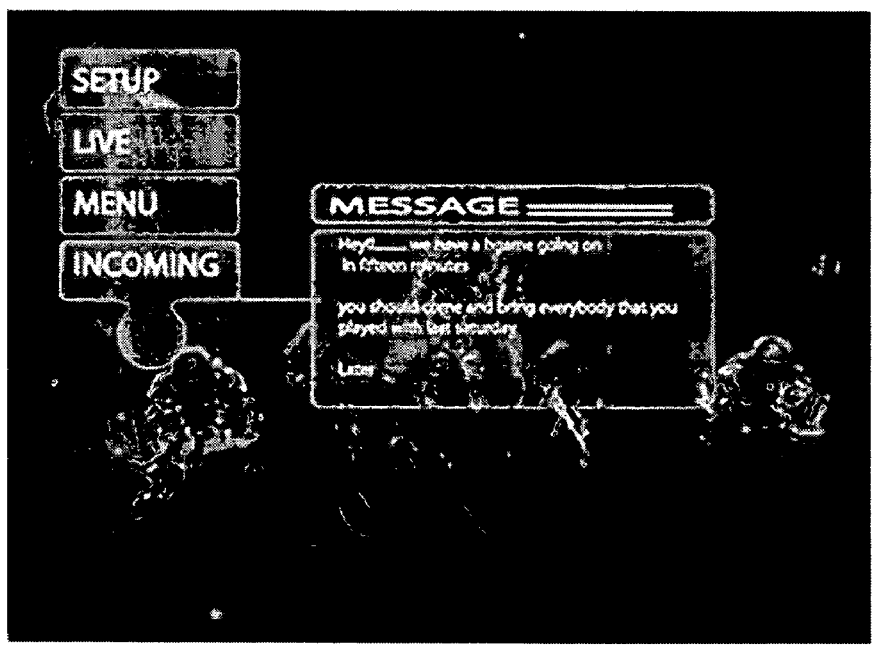

The user may then navigate among the system menu items using the controller 142. As shown in FIG. 8, if the user selects INCOMING, a user interface is rendered showing an incoming message as provided by a messaging system component.

Figure 9:
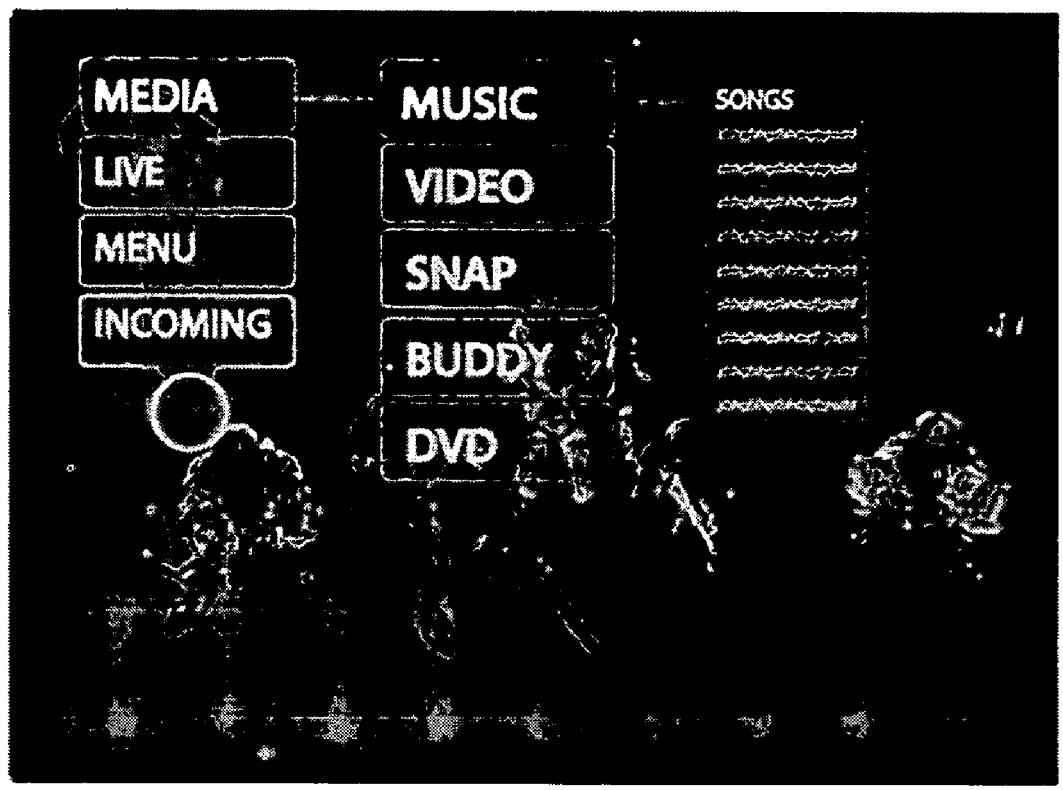

Referring to FIG. 9, the SETUP item has been replaced by a MEDIA item on the system menu. The MEDIA item provides the user with the ability to interact with various types of media when selected (e.g., MUSIC, VIDEO, SNAP, BUDDY and DVD). If the user selects MUSIC, a song list may be displayed showing songs that are stored locally on the gaming console 100, on a network location, etc. Different lists may be generated in accordance with the user selection.

In accordance with the present invention, pressing the interface button 200 at any point during the execution of the gaming application will bring up the system menu. This advantageously allows the user to access the system software regardless of application with which the user is interacting (e.g., playing a game, watching a DVD or listening to music). The system menu is preferably context sensitive. Thus, if the user has just received an invitation to play a game with a friend, pressing the interface button 200 will bring up UI that is appropriate to responding to the game invite (e.g., FIG. 8). Similarly, if a user connects a media device such as a digital camera and then presses the interface button 200, he or she will be navigated to the media area of the system menu (e.g., FIG. 9).

Because the system menu runs as a concurrent system application with other gaming applications and is designed to be able to take control of the GPU in order to display system UI when needed, system and notifications/messages are able to be displayed on-top of the gaming applications. If a user wishes to, he or she can stay connected via a system application to chat/email friends, while playing a single player game or watching a movie.

While the present invention has been described in connection with the preferred embodiments of the various Figs., it is to be understood that other similar embodiments may be used or modifications and additions may be made to the described embodiment for performing the same function of the present invention without deviating therefrom.

What is claimed is:

1. A computer readable storage medium having a tangible physical structure and including computer readable instructions for providing access to system functions during execution of a gaming application on a gaming console, the computer readable storage medium comprising:

instructions for reserving a first portion of hardware resources of the gaming console for a system application and reserving a second portion of the hardware resources for the gaming application such that the reserved first portion is not visible and not accessible by the gaming application;

instructions for configuring a graphics processing unit of the hardware to render a menu for the system application in response to a request for access to the system application during execution of the gaming application;

instructions configured to concurrently execute the system application and the gaming application, wherein the first portion of the hardware resources are used to execute the system application and the second portion of the hardware resources are used to execute the gaming application; and instructions for outputting a user interface for accessing the system application without terminating the gaming application.

2. The computer readable storage medium of claim 1, wherein an amount of the first portion of the hardware resources is constant.

3. The computer readable storage medium of claim 1, wherein the first portion of the hardware resources includes a first processor core and the second portion of the hardware resources includes a second processor core.

4. The tangible computer readable storage medium of claim 1, further comprising:
   instructions for pausing the gaming application in response to the received user input.

5. In a gaming console, a method of providing system functionalities provided by a system application concurrently executing with a gaming application, said method comprising:
   executing a system application using a first set of resources;
   executing a gaming application using a second set of resources while concurrently executing the system application, wherein the first set of resources is hidden and not accessible by the gaming application;
   receiving a request for said system functionalities; and
   rendering a system menu for the system application as an overlay on top of said gaming application without terminating the gaming application.

6. The method of claim 5, wherein said request for said system functionalities is generated by a system interface button provided on said controller.

7. The method of claim 6, further comprising providing a visual indicator on said controller that indicates said system is awaiting user input.

8. The method of claim 5 wherein said system menu is context sensitive and provides said system functionalities based on a current state of said gaming application.

9. The method of claim 5, wherein said system menu is accessible during the execution of said gaming application.

10. The method of claim 9, further comprising pausing said gaming application after said request is received.

11. A system comprising at least one processor and a memory communicatively coupled to said processor when said system is operational, said memory having stored therein computer instructions that upon execution by the processor cause:
   execution of a system application using a first set of resources;
   execution of a gaming application using a second set of resources while concurrently executing the system application, wherein the first set of resources is hidden and not accessible from the gaming application;
   receiving a request for said system functionalities; and
   rendering a system menu for the system application as an overlay on top of said gaming application without terminating the gaming application.

12. The system of claim 11, wherein said request for said system functionalities is generated by a system interface button provided on said controller.

13. The system of claim 12, further comprising:
   transmitting a signal that indicates said system is awaiting user input to the controller.

14. The system of claim 11 wherein said system menu is context sensitive and renders the system menu in accordance with a current state of said gaming application.

15. The system of claim 11, further comprising pausing said gaming application after said request is received.

16. The system of claim 15, wherein said system functionalities are in addition to functionalities provided by said gaming application.

* * * * *